(12) United States Patent
Sauermann et al.

(10) Patent No.: US 7,653,452 B2
(45) Date of Patent: Jan. 26, 2010

(54) METHODS AND COMPUTER SYSTEMS FOR REDUCING RUNTIMES IN MATERIAL REQUIREMENTS PLANNING

(75) Inventors: Volker Sauermann, Heidelberg (DE); Axel Von Bergen, Wiesloch (DE); Arne Schwarz, Walldorf (DE); Bernhard Lokowandt, Heidelberg (DE)

(73) Assignee: SAP AG, Walldorf (DE)

( * ) Notice: Subject to any disclaimer, the term of this patent is extended or adjusted under 35 U.S.C. 154(b) by 809 days.

(21) Appl. No.: 10/936,532

(22) Filed: Sep. 9, 2004

(65) Prior Publication Data

US 2005/0080690 A1 Apr. 14, 2005

(30) Foreign Application Priority Data

Sep. 9, 2003 (EP) .................................. 03020327

(51) Int. Cl.
*G06F 19/00* (2006.01)
*G06F 17/50* (2006.01)
(52) U.S. Cl. .......................... 700/106; 700/107; 705/29
(58) Field of Classification Search ........................ None
See application file for complete search history.

(56) References Cited

U.S. PATENT DOCUMENTS

| 5,764,519 A | * | 6/1998 | Tsukishima et al. | ......... 700/106 |
| 6,122,560 A | * | 9/2000 | Tsukishima et al. | ......... 700/106 |
| 2002/0198757 A1 | * | 12/2002 | Hegde et al. | ................... 705/8 |

* cited by examiner

*Primary Examiner*—F. Zeender
*Assistant Examiner*—Mussa Shaawat
(74) *Attorney, Agent, or Firm*—Finnegan, Henderson, Farabow, Garrett & Dunner, LLP

(57) ABSTRACT

Methods and computer systems are provided for reducing the runtime of a material requirements planning run. In one embodiment, a computer system loads a plurality of bills of materials into a data structure. The computer system may analyze parent-child relationships between components of the plurality of bills of materials in the data structure and set for each component in the data structure a counter value that indicates the number of parent components for each component. The counter value of a specific child component may be decremented when the planning of a parent component of the specific child component is completed. The computer system may then proceed with the planning of the specific child component if the associated counter value indicates that the planning of all parent components of the specific child component is completed.

20 Claims, 4 Drawing Sheets

| Component | Planning Level | Counter Value | Planning Flag |
|---|---|---|---|
| F1 | 0 | 0 | 1 |
| F2 | 0 | 0 | 1 |
| A1 | 1 | 1 | 1 |
| A2 | 1 | 2 | 1 |
| R1 | 2 | 1 | 1 |
| R2 | 2 | 1 | 1 |

METHODS AND COMPUTER SYSTEMS FOR REDUCING RUNTIMES IN MATERIAL REQUIREMENTS PLANNING

FIELD

Embodiments of the present invention generally relate to electronic data processing and, more particularly, to methods, computer program products and systems for material requirements planning (MRP).

BACKGROUND

Some computer systems, such as for example Enterprise Resource Planning (ERP) systems or Supply Chain Management (SCM) systems, support functions to plan material requirements for production. Complex products that include many components typically have large bills of materials (BOM). A bill of materials includes all components of a product in a hierarchical structure. The hierarchy indicates for each component which parent component is needed. A parent component can have multiple child components. When running material requirements planning for multiple products, multiple BOMs are processed simultaneously because some of the products may use the same components. Therefore, to plan these components that are used by multiple products, the requirements by each of the products are to be considered.

Some systems use parallelization to cope with a huge amount of data in case of simultaneous planning of many products. To ensure that all requirements are considered for a specific component, some systems create a data structure that includes the BOMs of all products being subject to material requirements planning and introduce planning levels in this data structure. Within a planning level, all components are planned before the system moves on to the next planning level. This guarantees that all requirements of the previous planning level are considered.

However, when using parallelization, it can occur that all but one component of a planning level are already planned and the system cannot move on to the next planning level because of the one still unplanned component. As a consequence, only one process is active while the last component of a planning level gets planned, whereas other parallel processes remain idle.

The idle processes have to wait until the last process finishes before parallel processing at the next planning level can continue. The waiting period can be long. In the case of configurable products, individual customer requirements exist at more than just the final product level which may cause waiting times at multiple planning levels. For example, if the final product is a kitchen, an inlay shelf may be included which is also included as a component in almost any other kitchen of the kitchen manufacturer. Thus, having orders for various kitchens creating requirements in the MRP for the same shelf, this shelf can become a long-runner in the MRP that occupies a process for hours and leaves the other processes waiting before moving to the next planning level.

Usually, such long-runners can be found at various planning levels and can form multiple barriers to parallel planning.

SUMMARY

Consistent with embodiments of the present invention, methods, computer systems and computer program products are provided for reducing MRP runtimes. This may be achieved by embodiments of the invention, as disclosed and claimed herein.

In accordance with one embodiment, a method is provided that comprises: loading a plurality of bills of materials into a data structure; analyzing parent-child relationships between components of the plurality of bills of materials in the data structure; setting for each component in the data structure a counter value that indicates the number of parent components for each component; decrementing the counter value of a specific child component when the planning of a parent component of the specific child component is completed; and proceeding with the planning of the specific child component if the associated counter value indicates that the planning of all parent components of the specific child component is completed.

Consistent with one embodiment, by introducing counters associated with components, the computer system may be able to decide about proceeding with the planning of components on a component-by-component basis. The need for planning levels to ensure the completeness of the planning of superordinate components may be eliminated. Further, parallelization of MRP runs can be used more efficiently because waiting times of idle processes can be avoided.

Aspects consistent with the present invention may be realized and attained by means of the elements and combinations particularly pointed out in this disclosure and the appended claims. The described combination of the features consistent with the invention is not be understood as a limitation, and all the features can be combined in other constellations without departing from the spirit and scope of the invention. It is to be understood that both the foregoing general description and the following detailed description are exemplary and explanatory only and are not restrictive of embodiments of the invention as described.

BRIEF DESCRIPTION OF THE DRAWINGS

The accompanying drawings, which are incorporated in and constitute a part of this specification, illustrate several embodiments of the invention. In the drawings:

FIG. 5 illustrates an exemplary implementation of the data structure as a non-relational table, consistent with an embodiment of the invention.

DETAILED DESCRIPTION

Reference will now be made in detail to the present embodiments (exemplary embodiments) of the invention, an examples of which are illustrated in the accompanying drawings. Wherever possible, the same reference numbers will be used throughout the drawings to refer to the same or like parts.

Figure 1:
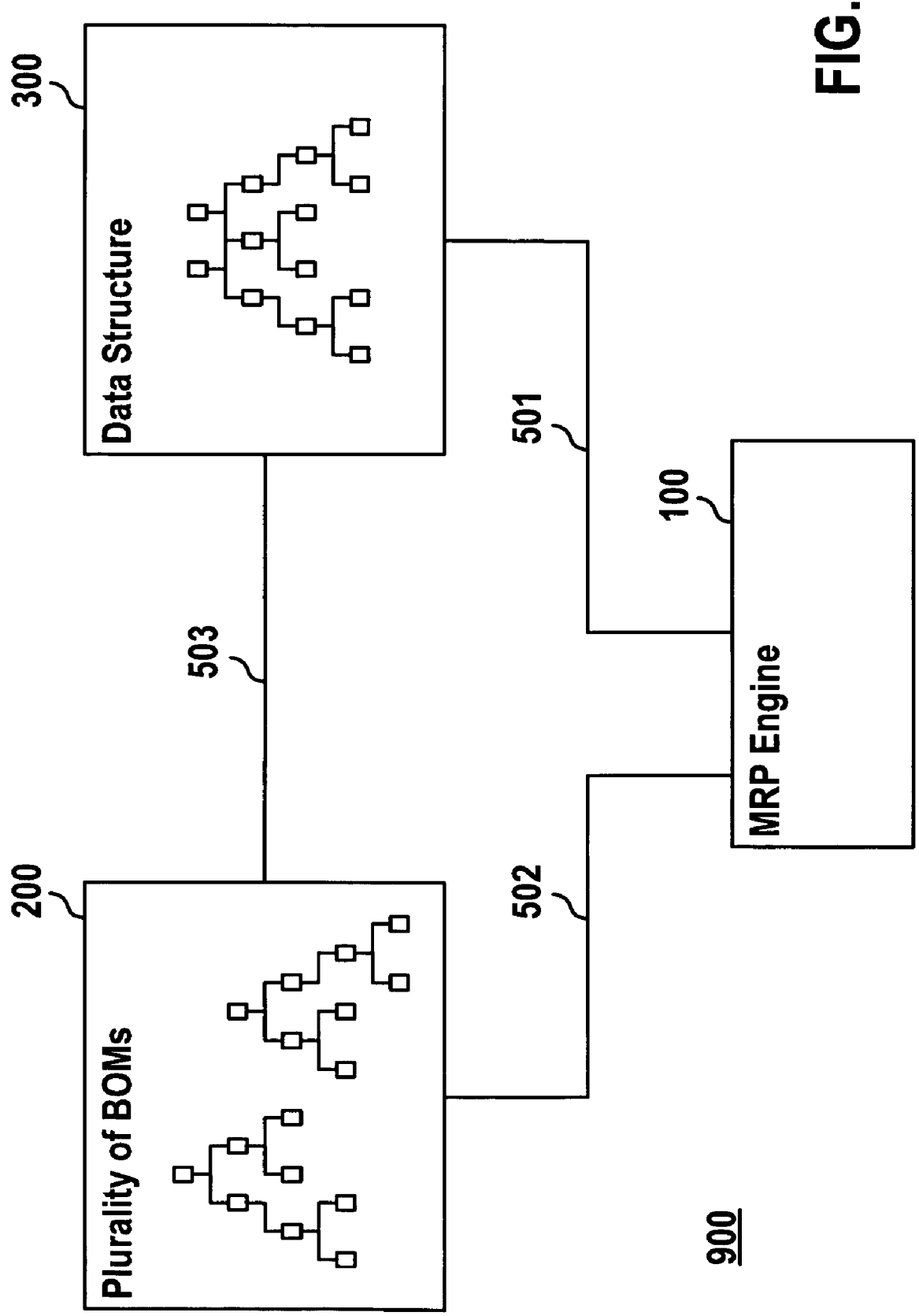
FIG. 1 is a block diagram of an exemplary computer system for materials requirement planning, consistent with an embodiment of the invention.

FIG. 1 is a block diagram of an exemplary computer system 900 for materials requirement planning, consistent with an embodiment of the invention. As illustrated, computer system 900 includes a first storage component 200 storing a plurality of bills of materials. Each bill of material may be associated with a product that can be subject to material requirements planning (MRP). The first storage component will also be referred to herein as a plurality (200) of BOMs.

The computer system 900 may also include a second storage component 300 that is used to store a data structure. The bills of materials associated with the products that are subject to MRP can be loaded through an interface 503 to the second storage component 300. The second storage component will also be referred to herein as the data structure 300.

In the data structure 300, a child component can have multiple parent components that belong to multiple BOMs. In other words, the data structure 300 is used to establish parent-child relationships between parent components of various BOMs and a child component that is used by these parent components. As a consequence, the child component learns about requirements of multiple parent components originating from multiple products. Further, the child component is stored once in the data structure 300 instead of the redundant storage in plurality 200 of BOMs, where the child component is included in any product's BOM that makes use of the child component.

For example, the plurality 200 of BOMS can be implemented as a memory portion including tables with specific columns for storing parent and child attributes for each component of a BOM. The memory portion can be part of a database or can be part of the main memory of the computer system 900.

The data structure 300 can also be implemented as a memory portion. Preferably, the data structure 300 is stored in the main memory because the access to the data structure 300 during the MRP run is faster than a database access would be.

The MRP run is controlled by an MRP engine 100 that has an interface 502 to the plurality 200 of BOMs and a further interface 501 to the data structure 300.

By way of example, the MRP engine may control which BOMs are loaded from the plurality 200 of BOMs into the data structure 300. The MRP engine may also analyze the parent-child relationships between components of the plurality 200 of BOMs in the data structure 300 to establish the above-explained parent-child relationships between parent components of various BOMs and a child component that is used by these parent components.

The MRP engine can be implemented as a computer program that is loaded into the memory of the computer system and executed by at least one processor of the system 900. Other possible functions of the MRP engine are explained together with the following figures.

Figure 2:
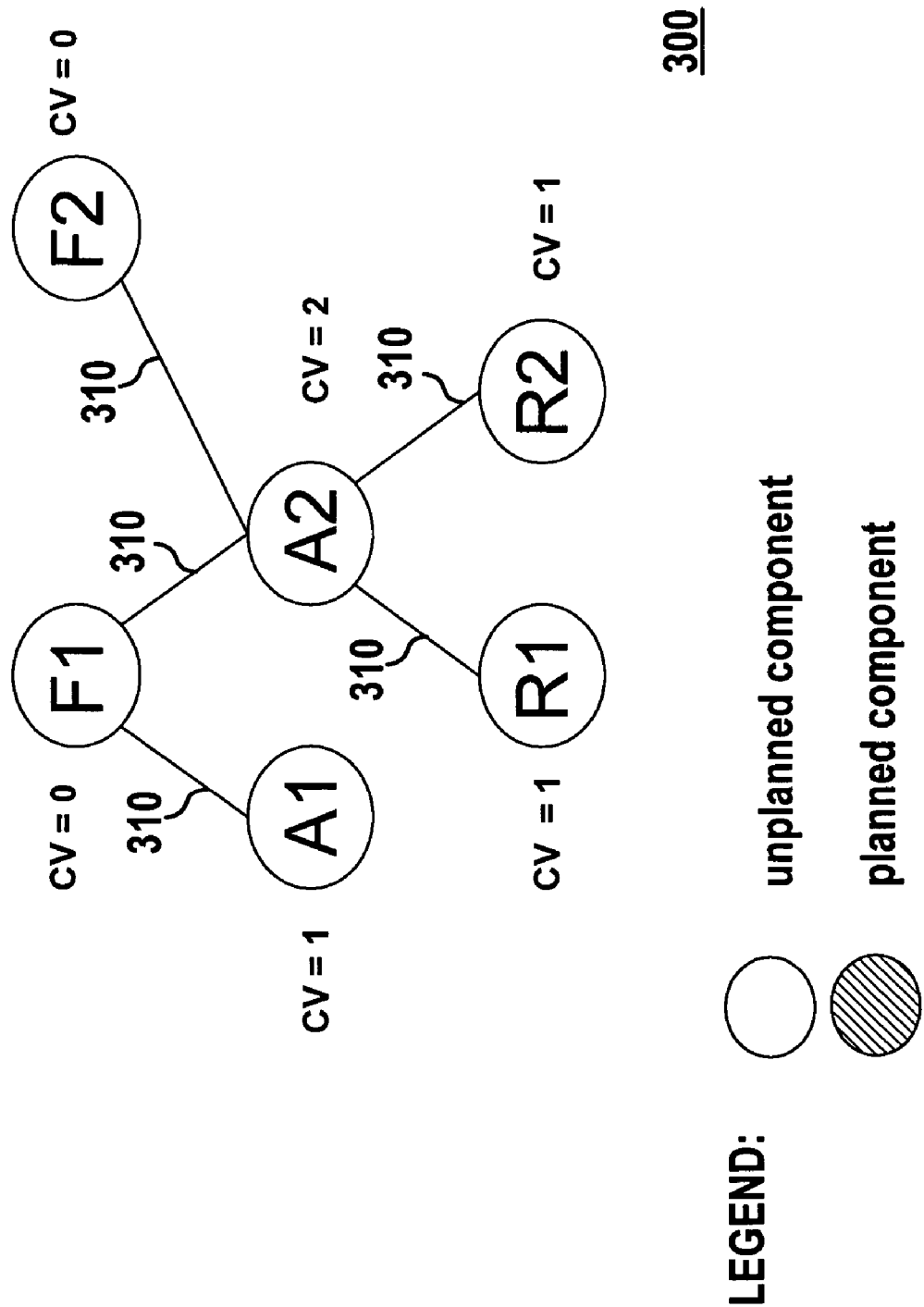
FIGS. 2 to 4 illustrate, by way of example, portions of a data structure that can be used with embodiments of the invention at different points in time.

FIG. 2 is an example of a portion of the data structure 300 at a first point in time after the data structure has been prepared by the MRP engine 100 to be used in a MRP run, consistent with an embodiment of the present invention.

Once the MRP engine 100 has analyzed parent-child relationships between the components of the plurality 200 of BOMs, the parent-child relationships 310 are established in the data structure 300. The parent-child relationships 310 in the data structure 300 allow a child component A2 to have multiple parent components F1, F2. By way of example, the components F1, F2 may correspond to final products.

As further shown in the example of FIG. 2, F1 includes the child components A1, A2, which may correspond to sub-assemblies, for instance. A2 further includes child components R1, R2, which may correspond to raw materials, for example. Additional sub-assemblies or raw materials that belong to F1 may be provided and are not shown for convenience of illustration.

In FIG. 2, F2 also includes the child component A2. Therefore, A2 has two parent components.

Once the parent-child relationships 310 are established in the data structure 300, the MRP engine 100 scans the data structure 300 and sets a counter value (CV) for each component in the data structure 300. Each counter value may indicate the number of parent components for the corresponding component. For example, the final products F1, F2 have no parent components. Therefore, the corresponding counter values are set to CV=0. Further, the sub-assembly A1 has the parent component F1. Therefore, its counter value is set to CV=1. Similarly, the sub-assembly A2 has the parent components F1 and F2. Therefore, its counter value is set to CV=2. And, the raw materials R1 and R2 have the parent component A2. Therefore, the corresponding counter values are set to CV=1.

At this point in time, no planning has been performed on any of the components which is illustrated in FIG. 2 by unfilled circles.

Figures 3, 4:
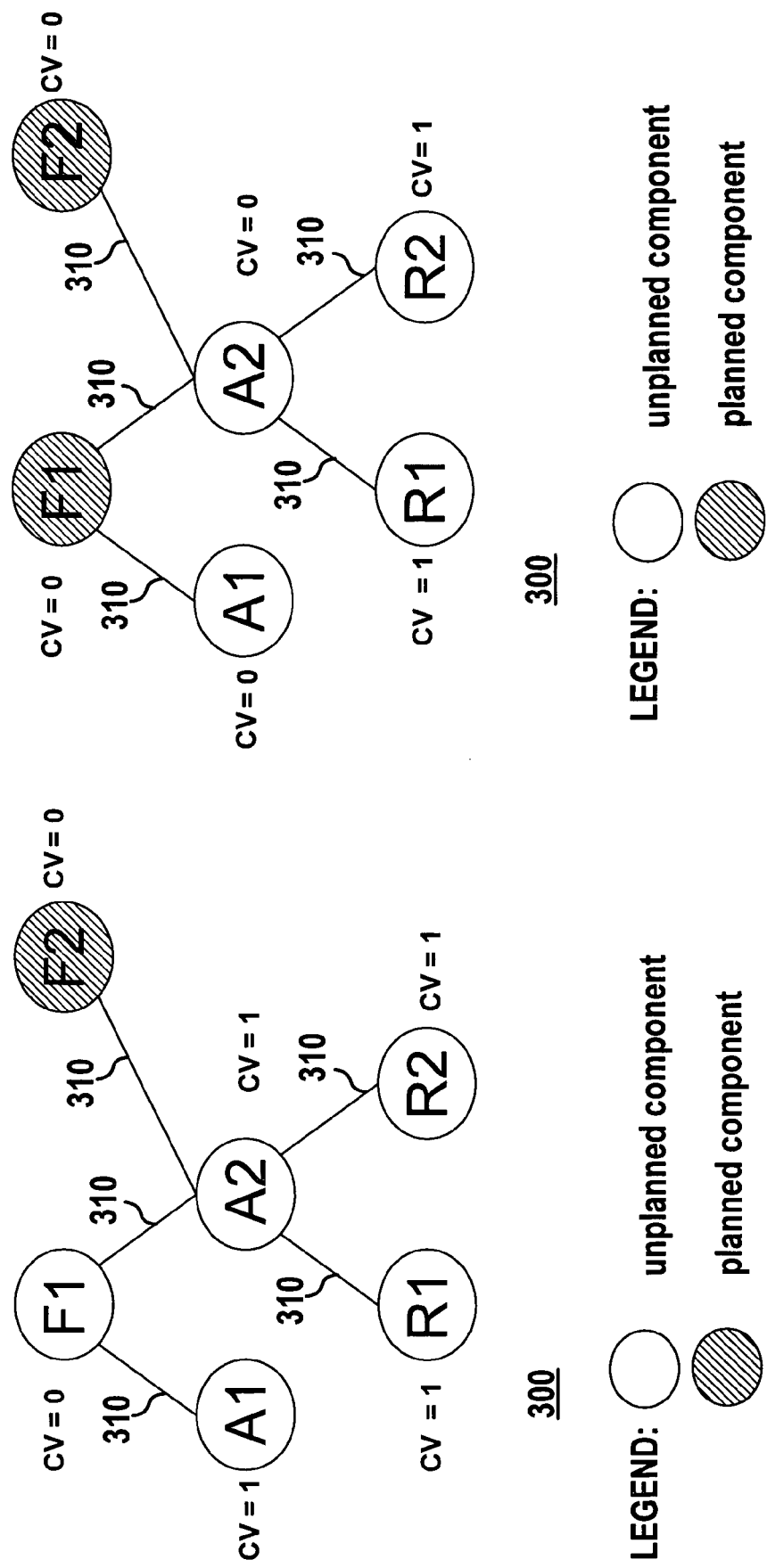

FIG. 3 shows an example of the portion of the data structure 300 at a second point in time after the MRP run has started. At the second point in time, the component F2 has been planned successfully. This is illustrated by a bar pattern in the drawing.

The MRP engine 100 may decrement the counter values of the child components of F2 after the completion of the planning of F2. In the example, the counter value of the specific child component A2 is decremented from CV=2 to CV=1.

FIG. 4 shows an example of the portion of the data structure 300 at a third point in time during the MRP run. At the third point in time, the planning of the component F1 has been completed (illustrated by the bar pattern in the drawing).

As a consequence, the MRP engine 100 decrements the counter values of the child components of F1. In the example, the counter values of the specific child components A2 and A1 are decremented to CV=0. The counter value CV=0 associated with the specific child component A2 indicates to the MRP engine that no further planning requirements are to be expected for the specific child component A2 from any of its parent components F1, F2 because the planning of the parent components F1, F2 is completed. Therefore, the MRP engine can proceed with the planning of the specific child component A2.

FIG. 5 is an example of an implementation of the data structure 300, consistent with an embodiment of the invention. In this example, the data structure 300 is implemented as a non-relational table using pointers to reflect the parent-child relationships 310 between components.

In FIG. 5, each row of the table 300 refers to a component in the data structure. The relationship pointers 310 point from a parent component to its child components. Equally, the pointers can be implemented to point from child components to their parent components.

By way of example, table 300 can be based on a material master table of an application system. A material master table typically includes master data for each component (e.g., unit of measure, lot size, etc.) that is handled by the application system. By adding the relationship pointers 310 to the material master table, the BOM information and the material master data information is available in a single data structure. Therefore, during the MRP run, only one data structure (table 300) needs to be accessed by the MRP engine. This reduces the total data access time.

In the example of FIG. 5, the table 300 has a component column for storing a component ID (e.g., F1, F2, A1, etc.), a planning level column, a counter value column and a planning flag column.

The counter value column may store for each component the associated counter value CV that is calculated, as described in FIGS. 2 to 4. FIG. 5 illustrates the state of the data structure at the first point in time (cf. FIG. 2).

The planning flag column may indicate for each component whether the component is subject to MRP or not. For example, some ERP systems set a planning flag for a specific component only if something has changed with respect to the requirements for this component. This can occur when the order size for a specific product using the specific component is changed or when further orders for products using the specific component are entered into the system or deleted from the system. Any of these cases has an impact on the requirements for the specific component and, therefore, will lead to setting a corresponding planning flag in the table 300.

When performing the MRP run as described in FIGS. 2 to 4, the MRP engine may set the counter values only for those components having a planning flag. Further, in this implementation, the MRP engine can proceed with the planning of a child component only if the child component has a planning flag. One advantage of using the planning flag is that the MRP engine knows, in advance, any component in the table 300 that will not be affected by the MRP run. Thus, the MRP engine can ignore any component without a planning flag.

The values of the planning level column of this implementation may be obtained by using the parent-child relationships in the data structure to define a planning level for each component. How to define planning levels is known in the art and documented, for example, in the SAP training course "LO050: PP-Planning" or the SAP workshop "EWC10: Technical optimization of the Availability Check".

In an embodiment of the invention, the MRP engine is able to proceed with the planning of the specific child component A2 that belongs to a planning level 1 which is subordinate to the planning level 0 of at least one of the corresponding parent components F1, F1 even if the planning of further components at the planning level 0 of the at least one corresponding parent component is incomplete. This allows the MRP engine to benefit from parallelization because the planning of the child component at the subordinate planning level can be performed by a first process while the planning of further components at superordinate planning levels can be performed by at least a second process in parallel. Without the concept of decrementing associated counters of child components (cf. FIGS. 2 to 4), the first process would need to wait until the further processes at the superordinate planning levels are completed.

Additionally, each component can have a further attribute for storing a time statistics where the planning duration of the previous MRP run is recorded for the component. In the table 300, the further attribute may correspond to a further column. In this case, statements about the probable planning duration for each component can be derived by the MRP engine from a forecast based on the previous MRP run, since usually MRP runs in a company tend to be similar.

Components can be bundled into packages for optimized parallel processing. For example, components can be bundled so that long-runners are grouped with short-runners. The approximate MRP runtimes for the packages can be calculated in advance, to improve their grouping and approximate a simultaneous completion of all processes. MRP runtime is proportional to the number of planning items, such as, for example, planned orders, purchase requisitions, delivery schedule lines, etc., that are to be created during the planning run. The number of planning items per product depends on various planning mechanisms, such as the lot-sizing procedure and/or the number of requirements (e.g., sales orders, forecast demand) and does not change much over time. The number of planning items per product can be stored in a planning file for later use. The packages can then be built packages in such a way, that a predefined number of planning items is created in each package. For example, in an SAP APO-PP/DS application, good performance results can be achieved when each package creates approximately 1000 planning items. Complex planning items may require smaller packages.

Embodiments of the invention may be implemented in digital electronic circuitry, or in computer hardware, firmware, software, or in combinations of them. Embodiments of the invention may also be implemented as an archiving computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. An archiving computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps consistent with embodiments of the present invention may be performed by one or more programmable processors executing a computer program to perform functions of the invention by operating on input data and generating output. Method steps can also be performed by, and apparatus consistent with the invention can be implemented as, special purpose logic circuitry, e.g., an FPGA (field programmable gate array) or an ASIC (application-specific integrated circuit).

Processors suitable for the execution of a computer program may include, by way of example, both general and special purpose microprocessors, and any one or more processors of any kind of digital computer. Generally, a processor will receive instructions and data from a read-only memory or a random access memory or both. The essential elements of a computer are at least one processor for executing instructions and one or more memory devices for storing instructions and data. In one embodiment, a computer will also include, or be operatively coupled to receive data from or transfer data to, or both, one or more mass storage devices for storing data, e.g., magnetic, magneto-optical disks, or optical disks. Information carriers suitable for embodying computer program instructions and data may include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, embodiments of the invention can be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server may arise by virtue of computer programs running on the respective computers and having a client-server relationship to each other.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for material requirements planning, the method being executed by a computer and comprising:
    loading, by using a processor of the computer, a plurality of bills of materials into a data structure stored in a storage device of the computer, the bills of materials having components with planning levels and the components being arranged in parent-child relationships, wherein the components include a specific child component having a specific planning level;
    analyzing, by using the processor, parent-child relationships between components of the plurality of bills of materials in the data structure;
    setting, by using the processor, for each component in the data structure a counter value that indicates a number of parent components for each component, the counter values including a specific counter value for the specific child component, wherein the specific counter value has a value different from a value of the specific planning level if a number of parent components of the specific child component are greater than or less than the value of the specific planning level;
    decrementing, by using the processor, the counter value of a specific child component when a planning of the parent component of the specific child component is completed, the counter value being decremented by a number used to count the parent component in the counter value during the setting of the counter value, wherein the specific planning level is subordinate to the planning level of an other component included in the bills of materials, the other component having the same planning level as the planning level of a parent component of the specific child component;
    setting, by using the processor, a planning flag for the specific child component; and
    proceeding, by using the processor, with the planning of the specific child component even if planning of the other component, which is at a higher planning level than the specific planning level, is not complete and if the planning flag is set for the specific child component.

2. The method of claim 1, wherein the counter values are set for each component having a planning flag.

3. The method of claim 1 further comprising proceeding with the planning of the specific child component if the associated counter value indicates that the planning of all parent components of the specific child component is completed.

4. The method of claim 1, wherein the proceeding step is performed by a first process executed by a first processor at the subordinate planning level and the planning of the other component is performed by a second process executed by a second processor arranged in parallel.

5. The method of claim 1, wherein the data structure is implemented as a non-relational table using pointers to reflect the parent-child relationships between components.

6. The method of claim 5, wherein a planning duration for each component is stored in the data structure.

7. The method of claim 6, wherein the planning duration for each component from a previous execution of the method is used to bundle components into packages for optimized parallel processing.

8. A computer program product tangibly embodied in a storage memory for material requirements planning, the storage memory comprising a instructions which when executed on a processor of a computer system cause the processor to perform a method, the method comprising:
    loading a plurality of bills of materials into a data structure, the bills of materials having components with planning levels and the components being arranged in parent-child relationships, wherein the components include a specific child component having a specific planning level;
    analyzing parent-child relationships between components of the plurality of bills of materials in the data structure;
    setting for each component in the data structure a counter value that indicates a number of parent components for each component, the counter values including a specific counter value for the specific child component, wherein the specific counter value has a value different from a value of the specific planning level if a number of parent components of the specific child component are greater than or less than the value of the specific planning level;
    decrementing the counter value of a specific child component when a planning of the parent component of the specific child component is completed, the counter value being decremented by a number used to count the parent component in the counter value during the setting of the counter value, wherein the specific planning level is subordinate to the planning level of an other component included in the bills of materials, the other component having the same planning level as the planning level of a parent component of the specific child component;
    setting a planning flag for the specific child component; and
    proceeding with the planning of the specific child component even if planning of the other components, which is at a higher planning level than the specific planning level, is not complete and if the planning flag is set for the specific child component.

9. The computer program product of claim 8, wherein the data structure is implemented as a non-relational table using pointers to reflect the parent-child relationships between components.

10. The computer program product of claim 8, wherein the counter values are set for each component having a planning flag.

11. The computer program product of claim 8 further comprising proceeding with the planning of the specific child component if the associated counter value indicates that the planning of all parent components of the specific child component is completed.

12. A computer system for material requirements planning, the computer system comprising:
    a first storage component for storing a plurality of bills of materials;
    a second storage component for loading the plurality of bills of materials into a data structure, the bills of materials having components with planning levels and the components being arranged in parent-child relationships, wherein the components include a specific child component having a specific planning level; and a processor that is adapted to:
- analyze parent-child relationships between components of the plurality of bills of materials in the data structure;
- set for each component in the data structure a counter value that indicates a number of parent components for each component, the counter values including a specific counter value for the specific child component, wherein the specific counter value has a value different from a value of the specific planning level if a number of parent components of the specific child component are greater than or less than the value of the specific planning level;
- decrement the counter value of a specific child component when a planning of the parent component of the specific child component is completed, the counter value being decremented by a number used to count the parent component in the counter value during the setting of the counter value, wherein the specific planning level is subordinate to the planning level of an other component included in the bills of materials, the other component having the same planning level as the planning level of a parent component of the specific child component;
- set a planning flag for the specific child component; and
- proceed with the planning of the specific child component even if planning of the other component, which is at a higher planning level than the specific planning level, is not complete and if the planning flag is set for the specific child component.

13. The computer system of claim 12, wherein the counter values are set for each component having a planning flag.

14. The computer system of claim 12, wherein the processor proceeds with the planning of the specific child component if the associated counter value indicates that the planning of all parent components of the specific child component is completed.

15. The computer system of claim 12, wherein the processor performs the planning of multiple components in parallel processes.

16. The computer system of the claim 12, wherein the data structure in the second storage component is implemented as a non-relational table using pointers to reflect the parent-child relationships between components.

17. The computer program product of claim 8, wherein a planning duration for each component is stored in the data structure.

18. The computer program product of claim 17, wherein the planning duration for each component from a previous execution of the method is used to bundle components into packages for optimized parallel processing.

19. The computer system of the claim 12, wherein a planning duration for each component is stored in the data structure.

20. The computer system of claim 19, wherein the planning duration for each component from a previous execution of the method is used to bundle components into packages for optimized parallel processing.

* * * * *

UNITED STATES PATENT AND TRADEMARK OFFICE
CERTIFICATE OF CORRECTION

PATENT NO. : 7,653,452 B2
APPLICATION NO. : 10/936532
DATED : January 26, 2010
INVENTOR(S) : Sauermann et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1058 days.

Signed and Sealed this

Twenty-third Day of November, 2010

David J. Kappos
*Director of the United States Patent and Trademark Office*